(12) United States Patent
Hu et al.

(10) Patent No.: US 10,208,699 B2
(45) Date of Patent: Feb. 19, 2019

(54) METHOD AND APPARATUS FOR CONTROLLING AN INTERNAL COMBUSTION ENGINE

(71) Applicant: GM GLOBAL TECHNOLOGY OPERATIONS LLC, Detroit, MI (US)

(72) Inventors: Yiran Hu, Shelby Township, MI (US); Jun-mo Kang, Ann Arbor, MI (US); Steven E. Muldoon, Royal Oak, MI (US); Chen-fang Chang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/641,944

(22) Filed: Jul. 5, 2017

(65) Prior Publication Data

US 2019/0010890 A1 Jan. 10, 2019

(51) Int. Cl.
*F02D 41/40* (2006.01)
*F02D 41/14* (2006.01)
*F02P 5/04* (2006.01)
*F02B 75/18* (2006.01)
*F02D 41/38* (2006.01)

(52) U.S. Cl.
CPC .......... *F02D 41/401* (2013.01); *F02B 75/18* (2013.01); *F02D 41/1439* (2013.01); *F02D 41/1444* (2013.01); *F02P 5/045* (2013.01); *F02D 2041/389* (2013.01); *F02D 2200/021* (2013.01); *F02D 2200/024* (2013.01); *F02D 2200/101* (2013.01); *F02D 2200/1002* (2013.01)

(58) Field of Classification Search
CPC .............. F02D 41/401; F02D 41/1444; F02D 41/1439; F02D 2200/021; F02D 2200/1002; F02D 2200/101; F02D 2200/024; F02D 2041/389; F02B 75/18; F02P 5/045
See application file for complete search history.

(56) References Cited

U.S. PATENT DOCUMENTS

2012/0277970 A1* 11/2012 Rayl ..................... F02D 35/023
                                                            701/102
2012/0316757 A1* 12/2012 Yun ..................... F02D 41/3035
                                                            701/105

(Continued)

*Primary Examiner* — Joseph Dallo
(74) *Attorney, Agent, or Firm* — Quinn IP Law

(57) ABSTRACT

A direct-injection internal combustion engine is described and includes a pressure sensor that is disposed to monitor in-cylinder combustion pressure. A method, executed as a control routine in an attached controller, includes monitoring engine speed, engine load, temperature and combustion pressure. Combustion variation parameters are determined based upon the combustion pressure. A desired state for a combustion parameter can be determined based upon the engine speed, the engine load, and the temperature, and an adjustment to the desired state for the combustion parameter can be determined based upon the combustion variation parameters, wherein the adjustment to the desired state is selected to achieve acceptable states for the combustion variation parameters. Operation of the internal combustion engine is controlled based upon the desired state for the combustion parameter and the adjustment to the desired state for the combustion parameter.

17 Claims, 3 Drawing Sheets

(56) References Cited

U.S. PATENT DOCUMENTS

| | | | |
|---|---|---|---|
| 2013/0024087 A1* | 1/2013 | Duval | F02D 35/02 |
| | | | 701/102 |
| 2013/0080026 A1* | 3/2013 | Kang | F02D 13/0207 |
| | | | 701/102 |
| 2015/0128909 A1* | 5/2015 | Guralp | F02D 41/1454 |
| | | | 123/478 |

* cited by examiner

METHOD AND APPARATUS FOR CONTROLLING AN INTERNAL COMBUSTION ENGINE

INTRODUCTION

A direct-injection internal combustion engine can be controlled during ongoing operation.

SUMMARY

A direct-injection internal combustion engine is described and includes a pressure sensor that is disposed to monitor in-cylinder combustion pressure. A method, executed as a control routine in an attached controller, includes monitoring engine speed, engine load, temperature and combustion pressure. Combustion variation parameters are determined based upon the combustion pressure. A desired state for a combustion parameter is determined based upon the engine speed, the engine load, and the temperature, and an adjustment to the desired state for the combustion parameter is determined based upon the combustion variation parameters, wherein the adjustment to the desired state is selected to achieve acceptable states for the combustion variation parameters. Operation of the internal combustion engine is controlled based upon the desired state for the combustion parameter and the adjustment to the desired state for the combustion parameter.

An aspect of the disclosure includes the combustion variation parameters being a ringing index and a coefficient of variation of indicated mean-effective pressure (COV-IMEP).

An aspect of the disclosure includes controlling timing of a fuel injection event based upon the desired state for the combustion parameter and the adjustment to the desired state for the combustion parameter.

Another aspect of the disclosure includes controlling timing of end-of-injection of the fuel injection event.

Another aspect of the disclosure includes the combustion parameter being a combustion heat release point, and wherein the combustion variation parameters include COV-IMEP, and wherein determining an adjustment to the desired state for the combustion parameter based upon the combustion variation parameters includes advancing the combustion heat release point when the COV-IMEP is greater than a threshold value.

Another aspect of the disclosure includes controlling timing of a fuel injection event and/or controlling timing of a spark ignition event to effect the advancing of the combustion heat release point when the COV-IMEP is greater than a threshold value.

Another aspect of the disclosure includes the combustion parameter being a combustion heat release point, and wherein the combustion variation parameters include a ringing index (RI), and wherein determining an adjustment to the desired state for the combustion parameter based upon the combustion variation parameters includes retarding the combustion heat release point when the RI is greater than a threshold value.

Another aspect of the disclosure includes controlling timing of a fuel injection event and/or controlling timing of a spark ignition event to effect the retarding of the combustion heat release point when the RI is greater than a threshold value.

Another aspect of the disclosure includes detecting, via the controller, occurrence of a fault in the internal combustion engine based upon the desired state for the combustion parameter and the adjustment to the desired state for the combustion parameter.

Another aspect of the disclosure includes the engine operating in low-combustion-temperature combustion mode.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
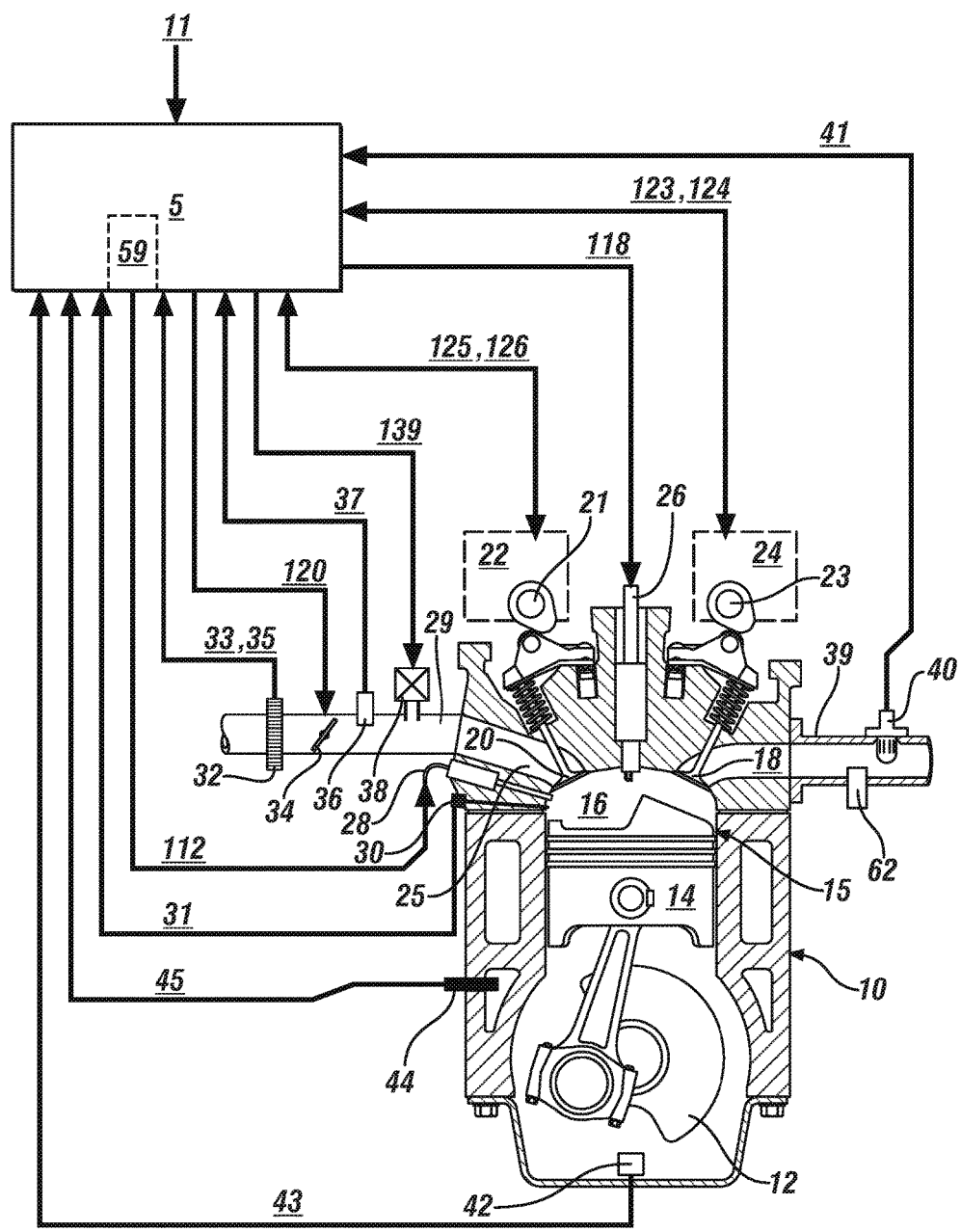
FIG. 1 schematically shows a cut-away side view of a single cylinder of an internal combustion engine and controller, in accordance with the disclosure.

Referring now to the drawings, wherein the depictions are for the purpose of illustrating certain exemplary embodiments only and not for the purpose of limiting the same, FIG. 1 schematically illustrates a cross-sectional view of an internal combustion engine 10 with an accompanying controller 5 that have been constructed in accordance with an embodiment of this disclosure. The controller 5 commands operation of the engine 10 in response to operating commands 11, which can include operator inputs and/or system inputs that are converted to an engine load command.

Example operator inputs include operator inputs to an accelerator pedal, a brake pedal and a transmission gear selector. One example of a system input is an input commanding a transmission shift. Another example of a system input can include power commands, such as when the engine 10 is configured to transfer power to an electric motor/generator to generate electric power for storage or propulsion, in one embodiment. The engine 10 can operate in one of a plurality of combustion modes, including a low-combustion-temperature combustion mode (LTC) such as a homogeneous-charge compression-ignition (HCCI) combustion mode, a stratified charge combustion mode, and a spark-ignition (SI) combustion mode. The engine 10 is configured to operate at a stoichiometric air/fuel ratio or at an air/fuel ratio that is primarily lean of stoichiometry. The disclosure may be applied to various internal combustion engine systems and cylinder events.

Low-combustion-temperature combustion modes include the engine operating at a dilute air-fuel mixture, i.e., lean of a stoichiometric air/fuel point, with relatively low peak combustion temperatures. Low-combustion-temperature combustion modes are particularly sensitive to CA50 timing and hardware variations, which can lead to either ringing or poor combustion stability. By way of a non-limiting example, the HCCI combustion mode is a distributed, flameless, kinetically-controlled auto-ignition combustion process with the engine operating at a dilute air-fuel mixture. An engine operating in the HCCI combustion mode has a cylinder charge that is preferably homogeneous in composition, temperature, and residual exhaust gases at intake valve closing time. The homogeneous air-fuel mixture minimizes occurrences of rich in-cylinder combustion zones that form particulate matter. When the engine 10 operates in the HCCI combustion mode, the engine 10 is controlled to operate at a lean or stoichiometric air/fuel ratio operation with the throttle wide open to minimize engine pumping losses. When the engine operates in the SI combustion mode, the engine 10 is controlled to operate at or near a stoichiometric air/fuel ratio, with the throttle valve controlled over a range of positions from 0% to 100% of a wide-open position to control intake airflow to achieve the stoichiometric air/fuel ratio. Combustion during engine operation in the HCCI combustion mode is affected by cylinder charge gas temperature before and during compression prior to ignition and by mixture composition of a cylinder charge. An engine operating in the HCCI combustion mode accounts for variations in ambient and engine operating conditions using calibration tables as part of an overall engine control scheme.

Engine control schemes associated with operation in low-combustion-temperature combustion modes include calibrations for controlling combustion parameters using input parameters including, e.g., engine load, engine speed and engine coolant temperature. One combustion parameter is a combustion heat release point, e.g., a CA50 point, which is a mass-burn-fraction point that describes, in engine crank angle degrees (CA), the point at which 50% of the heat of combustion has been released. The CA50 point functions as a control point for engine operation when the engine 10 is operating in the low-combustion-temperature combustion modes.

Cylinder charge gas temperatures may be affected by controlling hot gas residuals via engine valve overlap and controlling cold gas residuals via exhaust gas recirculation. Cylinder charge gas temperatures, pressure, composition may be influenced by engine environment factors, including, e.g., air temperature, humidity, altitude, and fuel parameters, e.g., RVP, energy content, and quality. A cylinder air charge is affected by the cylinder charge gas temperature and other factors.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners 25 of the combustion chambers 16. The air intake system has airflow ductwork and devices for monitoring and controlling the airflow. The air intake devices preferably include a mass airflow sensor 32 for monitoring mass airflow (MAF) 33 and intake air temperature (IAT) 35. A throttle valve 34 preferably includes an electronically-controlled device that is used to control airflow to the engine 10 in response to a control signal (ETC) 120 from the controller 5. A pressure sensor 36 in the intake manifold 29 is configured to monitor manifold absolute pressure (MAP) 37 and barometric pressure. An external flow passage recirculates exhaust gases from engine exhaust to the intake manifold 29, having a flow control valve referred to as an exhaust gas recirculation (EGR) valve 38. The controller 5 controls mass flow of exhaust gas to the intake manifold 29 by controlling opening of the EGR valve 38 via EGR command (EGR) 139.

Airflow from the intake manifold 29 into the combustion chamber 16 is controlled by one or more intake valve(s) 20 interacting with an intake camshaft 21 that rotationally couples to the crankshaft 12. Exhaust flow out of the combustion chamber 16 to an exhaust manifold 39 is controlled by one or more exhaust valve(s) 18 interacting with an exhaust camshaft 23 that rotationally couples to the crankshaft 12. The engine 10 is equipped with systems to control and adjust openings and closings of the intake and exhaust valves 20 and 18. In one embodiment, the openings and closings of the intake and exhaust valves 20 and 18 may be controlled and adjusted by controlling intake and exhaust variable cam phasing/variable lift control (VCP/VLC) devices 22 and 24 respectively. The intake and exhaust VCP/VLC devices 22 and 24 are configured to control and operate the intake camshaft 21 and the exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 in response to a control signal (iVLC) 125 and variably adjust and control phasing of the intake camshaft 21 for each cylinder 15 in response to a control signal (iVCP) 126. The exhaust VCP/VLC device 24 preferably includes a controllable mechanism operative to variably switch and control valve lift of the exhaust valve(s) 18 in response to a control signal (eVLC) 123 and variably adjust and control phasing of the exhaust camshaft 23 for each cylinder 15 in response to a control signal (eVCP) 124.

The intake and exhaust VCP/VLC devices 22 and 24 each preferably includes a controllable two-step VLC mechanism operative to control the magnitude of valve lift, or opening, of the intake and exhaust valve(s) 20 and 18, respectively, to one of two discrete steps. The intake and exhaust VCP/VLC devices 22 and 24 each preferably includes a variable cam phasing mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals eVLC 123, eVCP 124, iVLC 125, and iVCP 126.

The engine 10 employs a direct-injection fuel injection system including a plurality of high-pressure fuel injectors 28 that are configured to directly inject a mass of fuel into one of the combustion chambers 16 in response to an injector pulsewidth command 112 from the controller 5. The fuel injectors 28 are supplied pressurized fuel from a fuel distribution system. The engine 10 employs a spark-ignition system by which spark energy may be provided to a spark plug 26 for igniting or assisting in igniting cylinder charges in each of the combustion chambers 16 in response to a spark command 118 from the controller 5.

The engine 10 is equipped with various sensing devices for monitoring engine operation, including a crank sensor 42 having an output indicative of crankshaft rotational position, i.e., crank angle and speed (RPM) 43. A temperature sensor 44 is configured to monitor coolant temperature 45. A cylinder pressure sensor 30 is disposed to monitor parameters that can be associated in-cylinder combustion pressure 31. In one embodiment, there can be a cylinder pressure sensor 30 associated with each of the engine cylinders. In one embodiment, there can be a single cylinder pressure sensor 30 associated with all of the engine cylinders. In one embodiment, there can be a cylinder pressure sensor 30 associated with all of the engine cylinders for each bank of cylinders when the engine 10 is configured in a V-type arrangement. When there are cylinder pressure sensors 30 in all the cylinders, cylinder to cylinder variations can be identified. When there is one cylinder pressure sensor 30 per cylinder bank, bank to bank variations can be identified. When there is one cylinder pressure sensor 30 per engine, engine to engine variations can be identified. An exhaust gas sensor 40 is configured to monitor an exhaust gas parameter 41, e.g., air/fuel ratio (AFR). The combustion pressure 31 and the RPM 43 are monitored by the controller 5 to determine combustion timing, i.e., timing of combustion pressure relative to the crank angle of the crankshaft 12 for each cylinder 15 for each cylinder event. It is appreciated that combustion timing may be determined by other methods. An exhaust gas temperature sensor 62 can be configured to monitor exhaust gas temperature.

The controller 5 includes routine 59, which is executed to process the in-cylinder combustion pressure 31 that is measured by the combustion pressure sensor 30 to determine combustion variation parameters, which include a ringing index (RI) and a coefficient of variation of an indicated mean effective pressure (COV-IMEP) for each cylinder 15 for each cylinder event. The in-cylinder combustion pressure 31 that is measured by the combustion pressure sensor 30 can also be employed to determine the combustion heat release point, i.e., the CA50 point.

The RI is one index that quantifies combustion noise, and other indices, such as a pinging index or a knocking index, can be similarly employed. Likewise, the COV-IMEP is one index that quantifies combustion instability, and other indices can be similarly employed. High values for COV-IMEP indicate poor combustion and loss of combustion efficiency.

Preferably, the engine 10 and controller 5 are configured to monitor and determine states of the COV-IMEP for each of the engine cylinders 15 during each cylinder firing event. The RI is an index value that indicates an intensity of combustion noise that is generated in a cylinder during combustion, and can also indicate other high frequency combustion noise such as knocking or pinging. Engine ringing may include vibration caused during high cylinder pressure events such as may occur during operation in the HCCI combustion mode. Ringing may be influenced by ambient conditions such as humidity, barometric pressure, and temperature. Excessive levels of ringing may result in engine damage due to uncontrolled ignition and audible combustion noise.

The terms controller, control module, module, control, control unit, processor and similar terms refer to various combinations of Application Specific Integrated Circuit(s) (ASIC), electronic circuit(s), central processing unit(s), e.g., microprocessor(s), a non-transitory memory component and data buffers which can be transitory memory components. The non-transitory memory component may be in the form of memory and storage devices (read only, programmable read only, random access, hard drive, etc.), and is capable of storing machine readable instructions in the form of one or more software or firmware programs or routines, combinational logic circuit(s), input/output circuit(s) and devices, and other components that can be accessed by one or more processors to provide a described functionality. The data buffers may include signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. As used herein, the term "real-time" is used to refer to a response that is expected to occur within a preset response time after an event, wherein the preset response time is such that it permits the event to influence the response.

The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or another element that is discernible using one or more sensors and/or a physical model. A parameter can have a discrete value, e.g., either "1" or "0", or can be infinitely variable in value.

Figure 2:
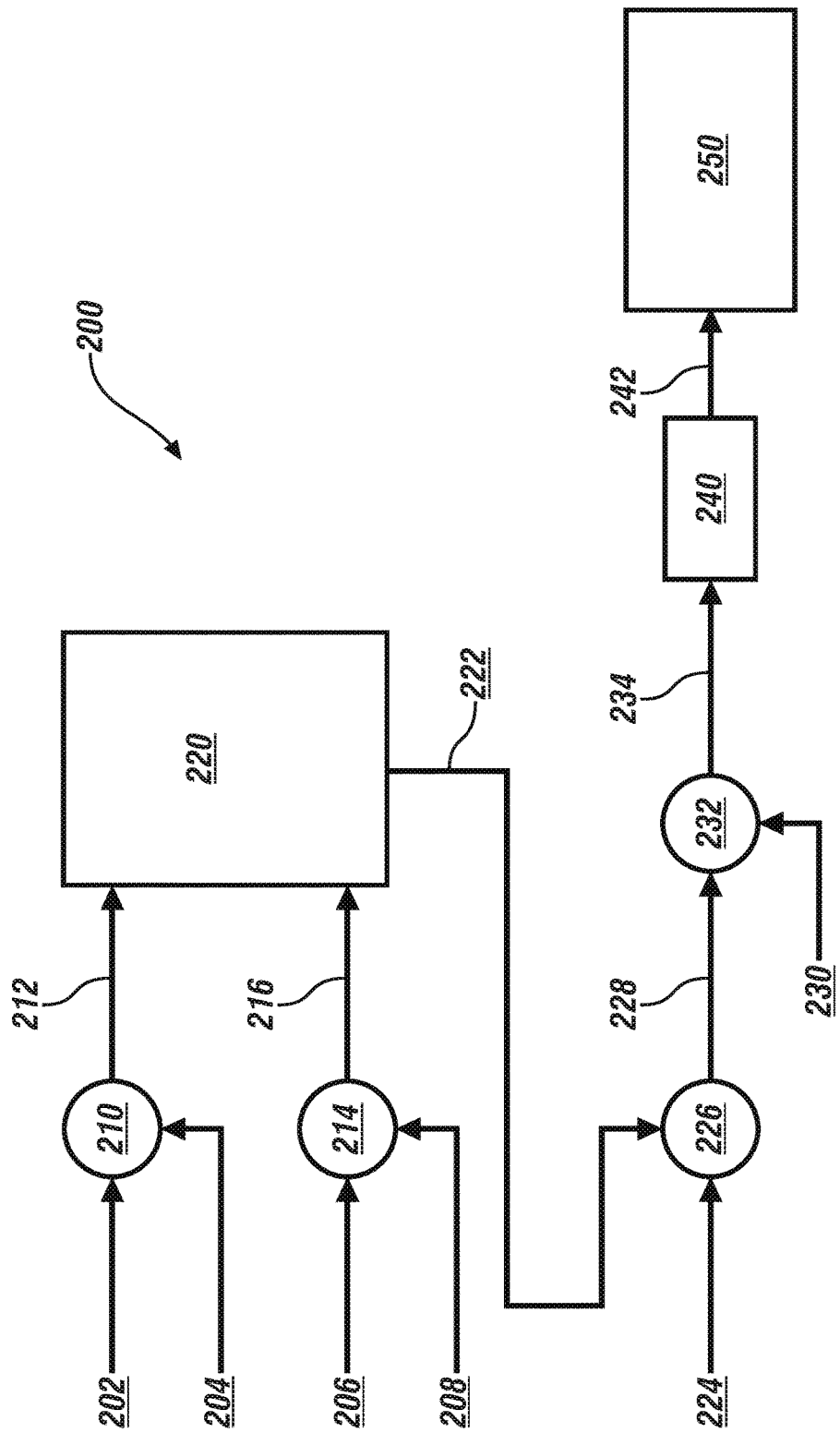
FIG. 2 schematically shows in block diagram form a control routine for controlling an internal combustion engine, in accordance with the disclosure.

FIG. 2 schematically shows in block diagram format a routine 200 that may be reduced to algorithmic code and executed in the controller 5 to control operation of an embodiment of the engine 10 that is described with reference to FIG. 1, including when the engine 10 is operating in the LTC combustion mode. The routine 200 executes to dynamically control one or more engine operating commands, e.g., fuel injection timing and/or spark ignition timing, to simultaneously minimize the magnitudes of the combustion variation parameters, i.e., RI and COV-IMEP during engine operation while controlling the engine 10 to operate in response to the operating commands 11. The teachings may be described herein in terms of functional and/or logical block components and/or various processing steps. It should be realized that such block components may be composed of hardware, software, and/or firmware components that have been configured to perform the specified functions.

Engine operating parameters associated with the routine 200 include engine speed, engine load, and temperature, with each of these parameters monitored by the controller 10. A desired CA50 state 224 is determined based upon the engine speed, engine load and engine temperature. The desired CA50 state 224 is one of an array of CA50 states that are preferably predetermined during engine development in relation to engine speed, engine load and engine temperature. The array of CA50 states can be stored in a memory device of the controller 5 and accessed during engine operation.

The desired CA50 state 224 is adjusting by adding a delta CA50 state 222 (226) to determine a modified CA50 state 228, and the modified CA50 state 228 is adjusted with a present measurement for the CA50 state 230 (232) to determine a delta CA50 state 234. The delta CA50 state 234 is input to a controller 240, which determines control states 242 for various engine actuators, including fuel injection, e.g., mass, timing of end of injection and ignition, e.g., spark timing. The various engine actuators are thereby controlled (250).

The delta CA50 state 222 is determined as follows. A desired ringing index (dRI) 202 can be determined for the engine speed and load, and is preferably a maximum allowable value for RI or a pre-calibrated value for the RI. The measured ringing index (mRI) 204 is also determined based upon signal input from the cylinder pressure sensor 30.

A first adjustment routine 210 determines a first adjustment in the desired CA50 point 212 based upon a difference between dRI 202 and mRI 204. Overall, when the mRI 204 is greater than the dRI 202, it indicates that combustion phasing as indicated by the CA50 point is too advanced, and there is a need to control engine operation, e.g., control fuel injection timing and/or spark timing to retard the CA50 point. Similarly, when the mRI 204 is less than the dRI 202, it indicates that combustion phasing as indicated by the CA50 point is too retarded, and there is a need to control engine operation, e.g., control fuel injection timing and/or spark timing to advance the CA50 point. In one embodiment, the fuel injection timing of interest is an end-of-injection (EOI) timing of a fuel injection event that occurs immediately before an expected occurrence of a combustion event during operation in the LTC combustion mode.

A desired COV (dCOV) 206 can be determined for the engine speed and load, and is preferably a maximum allowable value for COV or a pre-calibrated value for the COV. A measured COV (mCOV) 208 is also determined based upon signal input from the cylinder pressure sensor 30.

A second adjustment routine 214 determines a second adjustment in the desired CA50 point 216 based upon a difference between dCOV 206 and mCOV 208. Overall, when the mCOV 208 is greater than the dCOV 206, it indicates that combustion phasing as indicated by the CA50 point is too retarded, and there is a need to control engine operation, e.g., control fuel injection timing and/or spark timing, to advance the CA50 point. Again, the fuel injection timing of interest is an end-of-injection (EOI) timing of a fuel injection event that occurs immediately before an expected occurrence of a combustion event during operation in the LTC combustion mode. The first adjustment in the desired CA50 point 212 and the second adjustment in the desired CA50 point 216 are employed to select the delta CA50 state 222 based upon engine speed and the present combustion mode, preferably from a predetermined calibration table 220.

Figure 3:
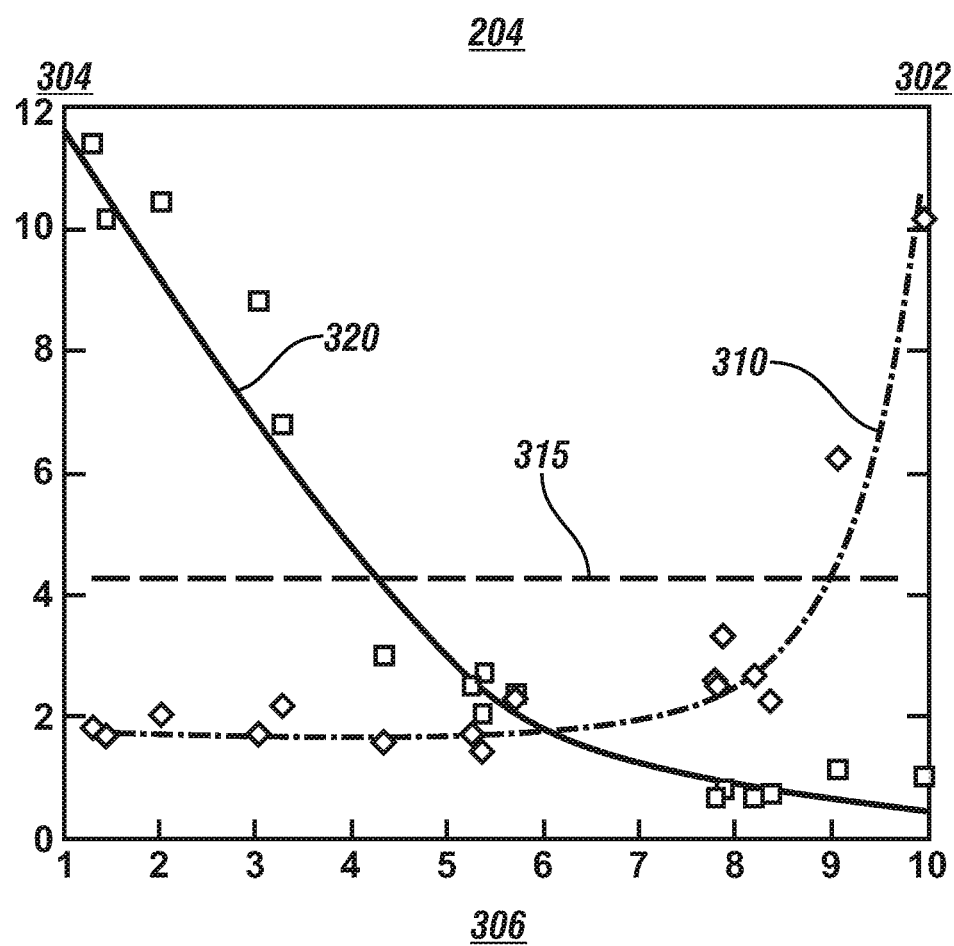
FIG. 3 graphically shows values for engine operating parameters including combustion variation parameters include of a coefficient of variation of an indicated mean-effective pressure (COV-IMEP) and a ringing index (RI) in relation to a combustion heat release point, in accordance with the disclosure.

FIG. 3 graphically shows example values for engine operating parameters including the combustion variation parameters of COV-IMEP and RI in relation to a combustion parameter (CA50) that are associated with operation of an embodiment of the engine 10 described with reference to FIG. 1. Line 310 indicates the COV-IMEP in relation to CA50, with the COV-IMEP indicated on the right vertical axis 302 and CA50 indicated on the horizontal axis 306. Line 320 indicates the RI in relation to CA50, with the RI indicated on the left vertical axis 304. A threshold value 315 is also indicated. The COV-IMEP and the RI can be dynamically determined based upon the monitored cylinder pressure. As illustrated, the RI increases as the CA50 point advances (to the left, as shown), and the COV-IMEP increases as the CA50 point retards (to the right, as shown). There is a range for CA50 at which both the RI and the COV-IMEP are below the threshold value 315, and this is the range which the controller 5 controls engine operation to achieve.

The concepts described herein can be advantageously employed to provide engine operation under low-combustion-temperature combustion modes that can simultaneously achieve stable combustion without pre-ignition, thus minimizing or eliminating combustion instability and combustion noise. An acceptable operating range for low-combustion-temperature operation can be narrow, and in-use variations associated with engine hardware and sensors can affect controllability. As such, the adaptive control strategies described herein can improve robustness of the low-combustion-temperature operation.

Furthermore, the combustion variation parameters, e.g., the COV-IMEP and RI, can be monitored in real-time and compared to stored, calibration values. Calibration limits for RI and COV-IMEP can be one or a combination of minimum, maximum and absolute value of time, amplitude, and/or an amplitude over time (e.g., jitter) based setpoint. The RI and COV-IMEP can be saved at periodic intervals to a memory device, e.g., after an elapsed operating time or mileage. Variations in the RI and COV can be evaluated for patterns or deviations from learned or expected values. Deviations may be ranked and classified to indicate whether the pressure monitoring components or engine combustion components are operating in accordance with specified parameters. A fault can be indicated when such operation is outside the specified parameters.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling operation of a direct-injection internal combustion engine, wherein the internal combustion engine includes a pressure sensor disposed to monitor in-cylinder pressure, the method comprising:
    monitoring engine speed, engine load, temperature;
    monitoring, via the pressure sensor, a combustion pressure;
    determining desired states for combustion variation parameters based upon the combustion pressure, wherein the combustion variation parameters include a ringing index and a coefficient of variation (COV);
    determining a desired state for a combustion parameter based upon the engine speed, the engine load, and the temperature;
    determining an adjustment to the desired state for the combustion parameter based upon the combustion variation parameters, wherein the adjustment to the desired state for the combustion parameter is selected to achieve acceptable states for the combustion variation parameters, including:
        determining a desired ringing index and a measured ringing index,
        determining a first adjustment in the desired state for the combustion parameter based upon a difference between desired ringing index and a measured ringing index,
        determining a desired COV and a measured COV,
        determining a second adjustment in the desired state for the combustion parameter based upon a difference between the desired COV and the measured COV,
        determining a delta combustion parameter based upon the first and second adjustments in the desired state for the combustion parameter, and
        adjusting the desired state for the combustion parameter based upon the delta combustion parameter;
    measuring the combustion parameter; and
    controlling, via a controller, operation of the internal combustion engine based upon the measured combustion parameter and the adjusted desired state for the combustion parameter.

2. The method of claim 1, wherein controlling operation of the internal combustion engine comprises controlling timing of a fuel injection event based upon the measured combustion parameter and the adjusted desired state for the combustion parameter.

3. The method of claim 2, wherein controlling the timing of the fuel injection event comprises controlling timing of end-of-injection of the fuel injection event.

4. The method of claim 1, wherein controlling operation of the internal combustion engine comprises controlling timing of a spark ignition event based upon the measured combustion parameter and the adjusted desired state for the combustion parameter.

5. The method of claim 1, wherein the combustion parameter comprises a combustion heat release point, and wherein the combustion variation parameter comprises COV-IMEP, and wherein determining an adjustment to the desired state for the combustion parameter based upon the combustion variation parameter comprises advancing the combustion heat release point when the COV-IMEP is greater than a threshold value.

6. The method of claim 5, comprises controlling timing of a fuel injection event to effect the advancing of the combustion heat release point when the COV-IMEP is greater than a threshold value.

7. The method of claim 1, wherein the combustion parameter comprises a combustion heat release point, and wherein the combustion variation parameter comprises a ringing index (RI), and wherein determining an adjustment to the desired state for the combustion parameter based upon the combustion variation parameter comprises retarding the combustion heat release point when the RI is greater than a threshold value.

8. The method of claim 7, comprises controlling timing of a fuel injection event to effect the retarding of the combustion heat release point when the RI is greater than a threshold value.

9. The method of claim 1, further comprising detecting, via the controller, occurrence of a fault in the internal combustion engine based upon the desired state for the combustion parameter and the adjustment to the desired state for the combustion parameter.

10. The method of claim 1, wherein the engine is operating in a low-combustion-temperature combustion mode.

11. The method of claim 10, wherein the low-combustion-temperature combustion mode comprises a homogeneous-charge combustion mode.

12. A multi-cylinder direct-injection internal combustion engine, comprising:
- a plurality of pistons disposed in a plurality of cylinders and coupled to a rotatable crankshaft;
- a plurality of sensors disposed to monitor engine speed, engine load, and temperature;
- a pressure sensor disposed to monitor an in-cylinder pressure;
- a controller, operatively connected to the internal combustion engine and in communication with the plurality of sensors and the pressure sensor, the controller including an instruction set, the instruction set executable to:
  - monitor engine speed, engine load, temperature;
  - monitor, via the pressure sensor, a combustion pressure;
  - determine desired states for combustion variation parameters including a ringing index and a COV-IMEP based upon the combustion pressure;
  - determine a desired state for a combustion parameter based upon the engine speed, the engine load, and the temperature;
  - determine an adjustment to the desired state for the combustion parameter based upon the ringing index and the COV-IMEP, wherein the adjustment to the desired state for the combustion parameter is selected to minimize the ringing index and the COV-IMEP; including
    - determine a desired ringing index and a measured ringing index,
    - determine a first adjustment in the desired state for the combustion parameter based upon a difference between desired ringing index and a measured ringing index,
    - determine a desired COV and a measured COV,
    - determine a second adjustment in the desired state for the combustion parameter based upon a difference between the desired COV and the measured COV,
    - determine a delta combustion parameter based upon the first and second adjustments in the desired state for the combustion parameter, and
    - adjust the desired state for the combustion parameter based upon the delta combustion parameter;
  - measure the combustion parameter; and
  - control operation of the internal combustion engine based upon the measured combustion parameter and the adjusted desired state for the combustion parameter.

13. The internal combustion engine of claim 12, wherein the pressure sensor disposed to monitor an in-cylinder pressure comprises a single pressure sensor disposed to monitor in-cylinder pressure in one of the cylinders.

14. The internal combustion engine of claim 12, wherein the pressure sensor disposed to monitor an in-cylinder pressure comprises a plurality of pressure sensors disposed to monitor in-cylinder pressure in each of the cylinders.

15. The internal combustion engine of claim 12, wherein the controller controls fuel injection timing based upon the desired state for the combustion parameter and the adjustment to the desired state for the combustion parameter.

16. The internal combustion engine of claim 12, wherein the internal combustion engine is disposed to operate in a low-combustion-temperature combustion mode.

17. The internal combustion engine of claim 16, wherein the low-combustion-temperature combustion mode comprises a homogeneous-charge combustion mode.

* * * * *